Figure 5:
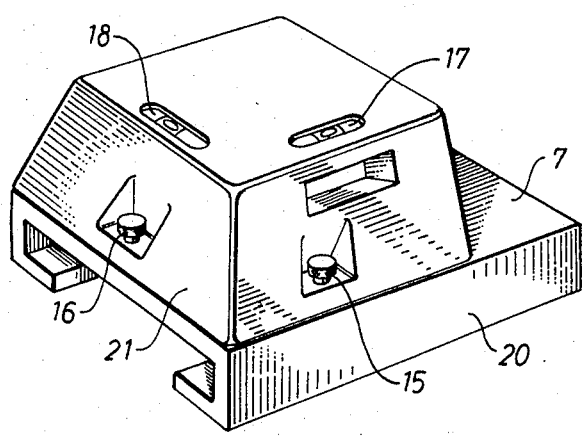

United States Patent [19]
Niss

[11] 3,765,764
[45] Oct. 16, 1973

[54] COORDINATE MEASURING INSTRUMENT
[75] Inventor: Erik Niss, Lidingo, Sweden
[73] Assignee: AGA Aktiebolag, Lidingo, Sweden
[22] Filed: Mar. 16, 1972
[21] Appl. No.: 235,118

[30] Foreign Application Priority Data
Mar. 23, 1971 Sweden.............................. 3780/71
Feb. 18, 1972 Sweden.............................. 2023/72

[52] U.S. Cl....................... 356/156, 356/3, 356/15,
331/94.5 A, 33/107 R, 33/274, 33/279, 350/287
[51] Int. Cl......................... G01b 11/00, G01b 3/08
[58] Field of Search ..................... 356/172, 3, 9, 15,
356/18, 19, 156; 331/94.5; 33/274, 278, 279,
280, 125 A, 107 R

[56] References Cited
UNITED STATES PATENTS
3,734,627  5/1973  Edwards.................. 356/153
2,975,522  3/1961  Postel ............................... 33/279 X
3,632,215  1/1972  Holtz ............................. 356/172 X
3,627,429  12/1971  Jaenicke ............................ 356/153
819,031  4/1906  Beck...................................... 356/15
2,172,098  9/1939  Eppenstein .......................... 356/15
3,549,257  12/1970  Murray ........................ 33/125 A X

*Primary Examiner*—David Schonberg
*Assistant Examiner*—Paul K. Godwin
*Attorney*—Lawrence I. Lerner et al.

[57] ABSTRACT

A measuring device for optical measurement of coordinates distance between two or more points. The device includes a light source in the beam direction of which one or more deflecting means is or are arranged to project the beam deflected onto indicators placed at the measuring points. The deflecting means are movable along a path, or along paths making angles with each other. The distance is directly readable on a measure tape or on an electronic or mechanical meter.

19 Claims, 6 Drawing Figures

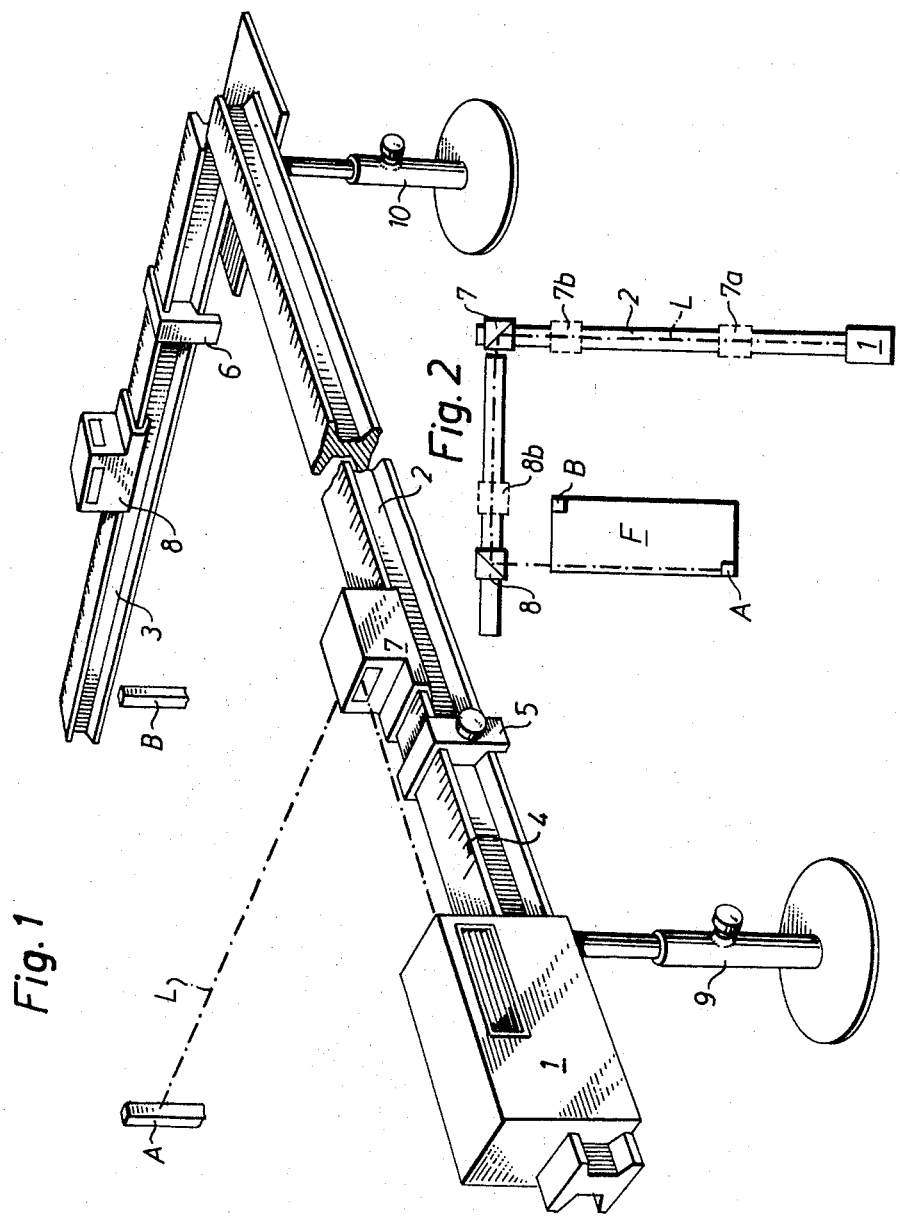

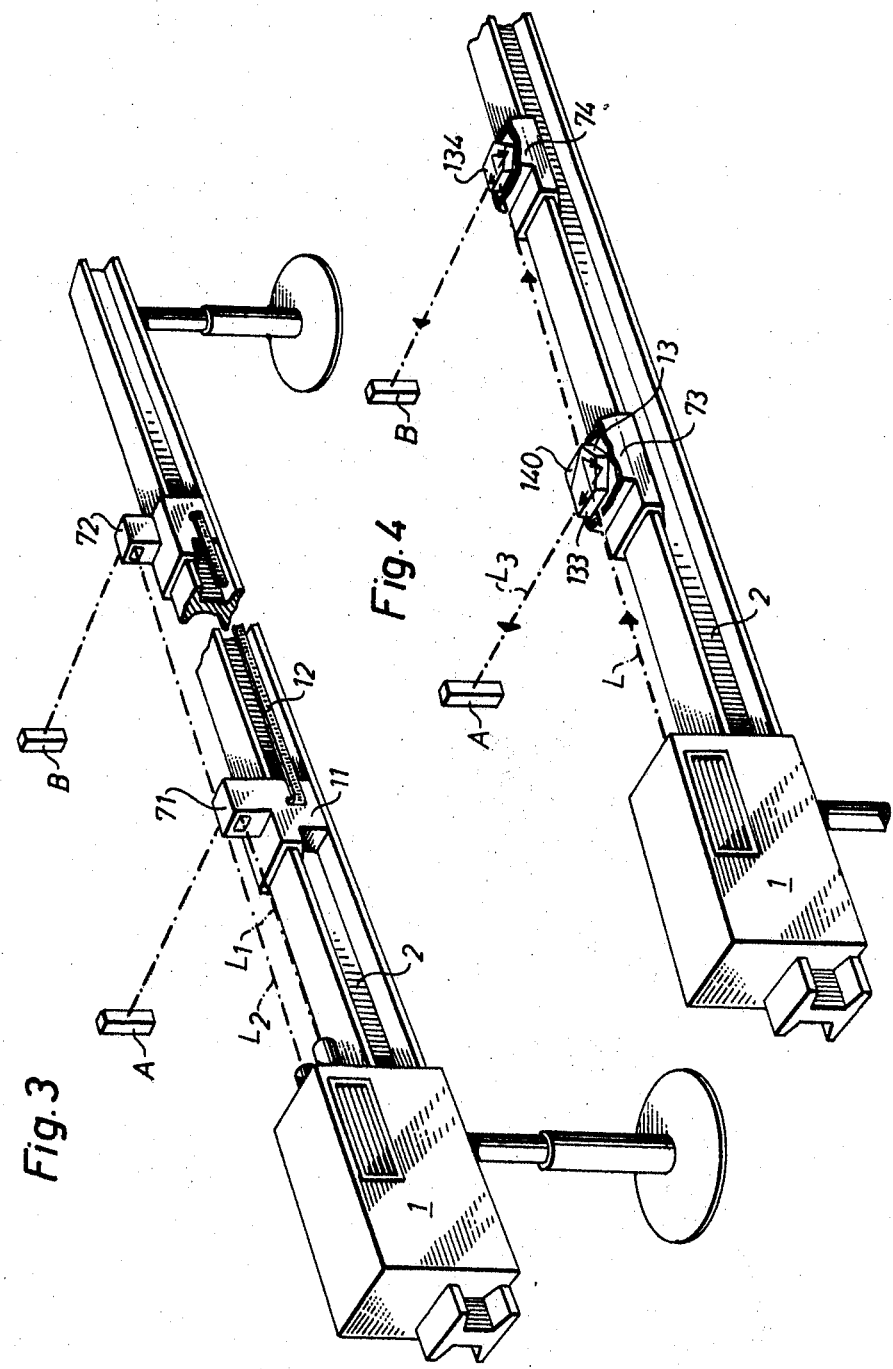

COORDINATE MEASURING INSTRUMENT

The present invention relates to a coordinate measuring instrument for optically measuring the distance between two or more measuring points. Instruments of this type normally comprise a light source and at least one deflecting means constructed to deflect the beam of light projected from the light source. The beam of light is deflected by the deflection means towards the measuring points whose mutual distance apart is to be measured.

Instruments of the aforedescribed type known to the art have a plurality of deflecting means which serve to defract the incoming and/or outgoing beam of light. Thus, with known instruments the beam projected from the light source is deflected at right angles in two opposite directions, the two deflected light beams being redeflected by prisms arranged on measuring arms for transmitting the light beams to respective objects to be measured. Owing to the fact that the measuring arms are arranged for parallel movement with and relative to each other and to the fact that one measuring arm is provided with a measurement scale which is marked by an indicating means on the other measuring arm, it is possible to read off the positions between the prisms. When the beams of light deflected through the prisms impinge on the objects to be measured, the prisms are positioned at the distance corresponding to the distance between the objects being measured. This is true provided that the measuring arms are parallel with the straight line extending between the objects being measured. This parallelism, however, is difficult to check.

Thus, the instrument briefly described above is relatively complicated, being provided with a plurality of mirrors or prisms and with two measuring arms which are movable relative to each other. There is therefore a need to provide a simpler, and therewith less expensive instrument which is nevertheless equally as accurate as the complicated instrument already known to the art.

Such an instrument is provided by means of the present invention, which is mainly characterized in that the light source and a light deflecting means are arranged in line with each other on a movement path cooperating with a length measuring means, the light deflecting means being arranged for movement along the path in a manner such that the beam of light is projected onto a measuring point and the position of the deflecting means being registered on the measuring means relative to the movement path, and subsequent to longitudinal movement of the deflecting means is projected onto a further measuring point, wherewith a new measurement value is recorded so that from the registered values the mutual distance between the measuring points seen in the axial direction of the movement path can be obtained.

Thus, the instrument according to the invention comprises in its basic form only one deflecting means and only one movement path, which is stationary in general. Further, the presence of an obstacle between the measuring points does not present an obstacle to carrying out the measurements. The measurements can be made irrespective of whether the measuring points are located at different distances from the instrument, since the light beam need not be optically focussed between the measuring point and the deflecting means. In addition hereto the instrument affords the not unimportant advantage of only requiring one operator to work the same.

According to one aspect of the invention, the movement path is in the form of a measuring beam and the light beam deflecting means is mounted on a slide arranged to move along the beam. In this way there is obtained a stable and particularly advantageous embodiment of the invention.

The aforedescribed coordinate measuring instrument according to the invention provides a simple and fully reliable instrument for measuring multi-dimensional coordinates. It has, however, occasionally been found desirable to project the beam of light from the light source onto the different measuring points simultaneously. In this way it is possible to check that the adjusted and registered measuring points have not been brought out of their respective positions during the continued adjustment work on the remaining measuring points. Further, in such instances when graduated measuring posts are mounted at the measuring points, reading of the posts is facilitated with a system in which the light beam from the light source is projected simultaneously onto the different measuring points.

Consequently, a further object of the present invention is to provide a coordinate measuring instrument which enables a beam of light projected from the light source to be projected simultaneously onto a number of measuring points.

This object is obtained by arranging two or more light deflecting means along the movement path, each of the deflecting means deflecting the light beam from the light source onto the measuring point to which the respective deflecting means is adjusted.

The length measuring means may be in the form of an extensible graduated member located between the indicating means and the deflecting means and/or between two of the deflecting means, the extensible member enabling a direct reading to be made of the distance between two measuring points.

In accordance with another aspect of the invention, the instrument is provided with a further deflecting means having a movement path located perpendicularly to the movement path for the first deflecting means, which enables the instrument to be adjusted exactly parallel to the distance to be measured. This embodiment of the instrument according to the invention can also be used to measure the distance in two directions at right angles to each other.

By providing each deflecting means with an angle indicating means, registration of the set position of respective deflecting means can be made more safely.

With a coordinate measuring instrument of the aforedescribed type, it is important that the light beam obtaines the same defraction angle irrespective of the position of the deflecting means on the movement path. Thus, the accuracy of the surface of the measuring beam forming the path along which the light deflecting means moves and of the measuring beam itself is of extreme importance. Since such measuring instruments are often used in workshops and subjected to rough treatment etc., it is difficult to maintain the instrument in its original accurate condition. It is also expensive to manufacture a measuring beam with the tolerances required in order to obtain a good measuring result.

The aforementioned solution by which each deflecting means is provided with an angle indicating means has reduced the requirements on the accuracy of the movement path of the measuring beam, since the angular position of the light deflecting means can be constantly observed by means of the associated angle indicating means. By providing the individual light deflecting means with manually or automatically operated angle adjusting means, it is possible to continuously adjust the deflecting means to a constant angular position, irrespective of the condition of the movement path.

Although different sources of light may be used, such as mercury lamps and the like, it has been found particularly convenient to use laser light, which gives a sharp and clear reference point on the object being measured even in daylight.

It has also be found particularly convenient to use a pentagon prism as the light deflecting means, since this prism is insensitive to small changes in the lateral displacement of the incident light beam. It is, of course, also possible to use other prisms or mirrors.

In special instances, such as when measuring vehicle bodies, it is also desired to measure vertical length differences at different measuring points on the object to be measured. In this case, the measuring points are suitably in the form of vertically graduated measuring posts attached to the object being measured at locations arranged with respect to a reference surface. By recording the position of the light beam vertically of respective measuring posts it is also possible, when using the instrument of the present invention, to obtain information on distance deviations in the vertical direction of the measuring points.

The instrument of the present invention will now be described in more detail with reference to the accompanying drawing, in which;

FIG. 1 illustrates a first embodiment of the coordinate measuring instrument according to the invention, FIG. 2 illustrates the path of the light beam when using two deflecting means extending at right angles to each other and constructed in the manner illustrated in FIG. 1, FIG. 3 illustrates a second embodiment of the coordinate measuring instrument according to the invention having laterally or vertically displaced deflecting means, FIG. 4 illustrates a third embodiment of the coordinate measuring instrument according to the invention with which the light deflecting means are located in line one behind the other.

Figure 6:
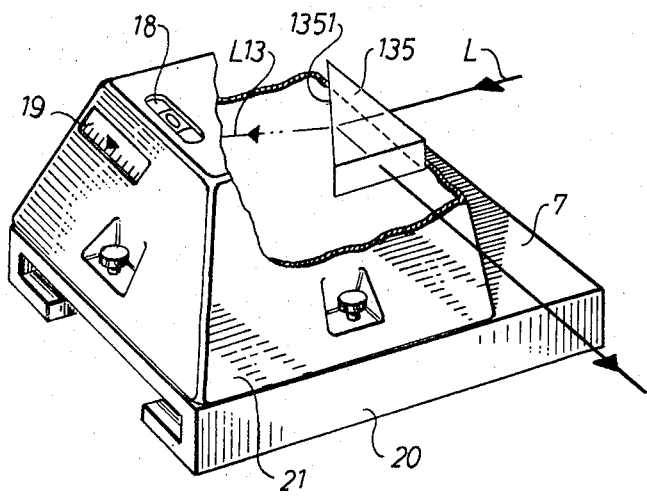

FIG. 5 illustrates diagrammatically a light deflecting means provided with an angle indicating means arranged in the horizontal plane and FIG. 6 illustrates diagrammatically an angle indicating means comprising a combination of levels disposed in the horizontal plane and a light indicating means.

The Figures are merely intended to illustrate in a simple manner the various embodiments of the measuring instrument according to the invention. Thus, in FIG. 1 there is shown a light source 1, suitably laser light, arranged at one end of a measuring beam 2. Located in line with the light source 1 is a light deflecting means 7 arranged to slide on the top surface of the beam 2. Also arranged to move along the beam 2 is an indicating device 5 which can be locked in selected positions along said beam. Further, in the illustrated embodiment the beam 2 is graduated as shown at 4 and can be raised and lowered on posts 9, 10.

FIG. 1 also illustrates how the instrument according to the invention can be supplemented with a further measuring beam 3 (only a short portion of the beam being shown) which forms a right angle with the first beam 2 and supports a light deflecting means 8 and an indicating means 6 in the same manner as the first beam 7.

In the illustrated position of the light deflecting means 7, the beam of light L from the light source 1 is deflected onto a measuring point A. The operator is required to read the relative position of the light deflecting means 7 on the measuring scale 4 in order to obtain a zero point for the distance measurement to be made between the measuring points A and B. This reading is suitably made at the end portion of the light deflecting means 7 nearest the light source 1. To facilitate this measurement, however, it is suitable to use the indicating means 5, which is moved along the beam by contact with the end of the deflecting means 7 and locked in the selected position therealong. The light deflecting means 7 can then again be moved along the beam 2 to the point where the deflected light beam L impinges on the measuring point B. In this position of the light deflecting means 7 the distance between the measuring points A and B can be established, by reading the relative position of the light deflecting means 7 and subtracting the recorded measurement from the first measurement or from the measurement marked by the indicating means 5.

In order to obtain an accurate measuring value of the distance between the measuring points, it is necessary for the measuring beam 2 to be parallel with the distance between the measuring points A and B. To facilitate parallel adjustment of the beam 2 it is convenient to use the further measuring beam 3 having associated light deflecting means 8 and located at right angles to the first measuring beam 2. In this instance, the light deflecting means 7 is moved to the end of the measuring beam 2 so that the light beam L deflected from the deflecting means is fed into the deflecting means 8 and re-deflected thereby. By moving the deflecting means 8 along the measuring beam 3 it is possible for the operator to establish whether the deflected beam L impinges on the measuring point A and the measuring point B. If the deflected beam L impinges on both the measuring point A and the measuring point B, the beam 2 is not parallel with the line A B. On the other hand, if the beam L does not impinge on the measuring point A, then the beam 2 is parallel with said line.

Another use of the instrument having two measuring beams 2 and 3 is illustrated in FIG. 2, where the distance between two measuring points A and B on an object F is to be measured. In this instance the measuring operation is started after the instrument and/or the object to be measured is arranged in the manner desired, by moving the light deflecting means 7 along the measuring beam 2 so that the deflected light beam L impinges on the measuring point A. In this position, 7A, and indicating means is locked in the position adopted thereby as a result of movement of the means 7 and the light deflecting means 7 moved along the beam 2 until the deflected beam of light L impinges on the measuring point B. The deflecting means 7 is then in the position shown at 7B and the distance between the measuring points can be obtained in the above described manner. The light deflecting means 7 is then moved along its movement path to the end of the measuring beam 2, wherewith the deflected light beam L impinges on the deflecting means 8. By moving the deflecting means 8 along the measuring beam 3, a position 8B is reached where the re-deflected light beam L impinges on the measuring point B from a different direction. The indicating means 5 (FIG. 1) cooperating with the measuring beam 3 is locked in the position 8B and the deflecting means 8 moved along the measuring beam 3 until the deflected light beam L impinges on the measuring point A. In this way, it is possible to read the distance between the measuring points A and B (which is perpendicular to the distance first read off) by means of the deflecting means 8 and the indicating means 6.

Thus, with the above described instrument it is possible to determine the coordinates of a number of measuring points in the X and Y plane. By supplementing the instrument according to the invention with posts located at the measuring points and adjusted at right angles to the measuring beams 2 and 3 and provided with graduations with respect to a reference plane, the instrument can also be made to give the mutual position of the measuring points in a Z plane, since the spots of light produced by the impingement of the light beam L on respective posts fall on the graduations, which are read off. For example, the object to be measured, which may be the body of a vehicle, may be suspended from a traverse or the like and the measuring posts suspended from the points which serve as the fixing points of the object. Such a measuring operation naturally requires accurate adjustment in the horizontal position of the measuring beams 2 and 3.

With the embodiment of the measuring instrument according to the invention illustrated in FIG. 3, the measuring beam 2 carries two light deflecting means 71 and 72 which move parallel to each other. The light source 1 arranged at one end of the measuring beam 2 projects a beam of light which may either be a broad ribbon of light or may be divided into a number of part beams L1, L2, so that each light deflecting means 71, 72 is impinged upon. The light impinges on the deflecting means 71, 72 simultaneously and the incident light beams L1, L2 are deflected towards the measuring points A, B whose distance parallel with the measuring beam 2 is to be measured.

In accordance with one measuring method, the light deflecting means 71, 72 are moved along the measuring beam 72 so that the deflected light beams L1, L2 impinge upon the intended measuring points A and B. When this takes place, the desired distance measurement is obtained directly between the light deflecting means 71, 72, said distance being measured with a separate measuring device or with a measuring device attached to or mounted on the instrument. Thus, one light deflecting means 71 may be provided with a casing 11 for a measuring tape 12, one of which is secured to the second light deflecting means 72. The measuring tape 12 may suitably be capable of automatically rolling up in the casing 11. Other examples of measuring devices include mechanically or electronically actuatable counters mounted, for example, at the light source 1 and actuated by the light deflecting means 71, 72.

In FIG. 4 there is illustrated a third embodiment of the measuring instrument according to the invention. In this embodiment the light deflecting means 73, 74, are arranged in line with each other and with the light source 1 on the measuring beam 2. This is made possible owing to the fact that the lens 13 in the light deflecting means 73 located nearest the light source 1 is constructed to deflect a portion of the light beam 11 projected from the light source 1 in the form of a part light beam L3 directed towards the measuring point A and allows through or projects the remaining portion of the light beam L to a following deflecting means 74. The light deflecting means 73, 74 in the embodiment of FIG. 4 are provided with pentagon prisms 133, 123 for deflecting the light beam. The prism 133 of one light deflecting means 73 is provided with a part reflecting wall and an auxiliary prism 140 adapted to permit the remaining portion of the light beam L to pass through.

A measurement is taken with the third embodiment of the measuring instrument according to the invention in the same manner as with the measuring instrument illustrated in FIG. 1.

It will readily be understood that the measuring instruments illustrated in FIGS. 3 and 4 may be provided with a plurality of light deflecting means arranged and constructed in a manner similar to the light deflecting means 71, 72, 73 and 74. It is also possible to provide the measuring instrument with a measuring beam 3 located at an angle to the measuring beam 2, as illustrated in FIGS. 1 and 2. The additional measuring beams 3 may be provided with a desired number of light deflecting means 8 and a stationary light deflecting means may be arranged on the measuring beam 2 at the point nearest the additional measuring beam 3.

As mentioned above the lens 13 of the light deflecting means 71, 72, 73 and 74 may be pentagon prisms such as those indicated at 133, 134. It is also possible to provide the lens with prisms of a different type or with mirrors. One advantage afforded with pentagon prisms is that the path of the light in the deflecting means 71, 72, 73, 74 is insensitive to rotational deviations.

It has, however, been discovered that the light deflecting means 71, 72, 73, 74 when moved along the measuring beam 2 deviates to different extents from the desired horizontal position owing to relatively small faults in the movement path on the measuring beam or in its bearings. By providing each separate light deflecting means 7, which may be in the form of a traveller 20 arranged on the measuring beam 2 and having a lens housing 21 resiliently mounted thereon, with adjusting means 15, 16, which may comprise two adjusting screws for setting the correct angle position with respect to the horizontal plane, accurate measuring values can be obtained. Such an arrangement is illustrated in FIG. 5. To illustrate wrong angles of the light deflecting means 7, said means has been provided with angle indicating means 17, 18 which in the illustrated embodiment comprise two levels, although it is also possible to replace the two levels with one single circular level placed in the horizontal plane.

When using a lens other than a pentagon lens, it is also necessary to provide indicating means for illustrating rotational deviations of the deflecting means 7. FIG. 6 illustrates a light deflecting means 7 partially in section with a triangular prism 135. This deflecting means 7 must thus be checked and adjusted with respect to three different angular positions: The rotation angle around the vertical axis of the prism 135 and the two horizontal positions forming together an angle of 90°. For the purpose of indicating errors in the two last mentioned angles the light deflecting means 7, similarly to the embodiment of FIG. 5 has been provided with two levels, of which only one, 18, is shown. For the purpose of illustrating errors in the rotation angle, the incident wall 1351 of the prism 135 has been made partially reflecting, and hence the incident light beam L partially passes through the prism and is refracted to form a check light beam L13. The check light beam L13 is caused to impinge on an indicating means, which in the illustrated embodiment comprises a single transparent scale 19. The prism 135 is suitably rotatably mounted and connected with an adjusting means (not shown). In this way a constant check can be made that the light deflecting means 7 is positioned correctly.

The above described angle indicating means 17, 18 and 19 may also be in the form of electrical units. For example, the levels 17 and 18 may be replaced with mercury flip-flop switches and the scale 19 with a photo diode with associated circuit. The electrical arrangements may be arranged to actuate alarm devices, such as signal lamps, or control motors arranged for the purpose of adjusting the light deflecting means 7.

As will be evident from the aforegoing, the coordinate measuring instrument according to the invention can be modified in many ways and thus the described and illustrated embodiments are given only as examples of the principle of the invention.

I claim:

1. A measuring instrument for optically measuring the coordinate distance between two or more measuring points comprising:
   a light source for producing a relatively narrow light beam;
   means first for deflecting said light beam at a constant angle;
   means for mounting said light source;
   means for mounting said light deflecting means, in a line which extends through said light source movable along a path
   registering means mounted for movement along said path; and
   a length measuring means collapsibly extendable and connected between said registering means and said light deflecting means so that the distance between said registering means and said light deflecting means can be directly measured.

2. The instrument as defined in claim 1 also including a measuring support beam for defining said path wherein said means for mounting said light deflecting means is slidably movable on said measuring support beam.

3. The instrument as defined in claim 1 also including a second light deflecting means mounted on said registering means; said second light deflecting means including means mounted therein for partially deflecting said light beam and partially transmitting said light beam to said first light deflecting means.

4. The instrument as defined by claim 1 in which said first light deflecting means includes an angle indicating means which presents a measure of the angle of light beam deflection.

5. The instrument as defined in claim 4 in which said angle indicating means comprises two horizontal level indicators located in the horizontal plane at right angles to each other.

6. The instrument as defined in claim 4 in which the angle indicating means comprises a display device against which a small portion of said light beam projected onto to said first light deflecting means is directed as a check for the angle of light beam deflection.

7. The instrument as defined in claim 4 in which said angle indicating means comprises a combination of horizontal level indicators and angle of deflection indicators.

8. The instrument as defined in claim 1 in which said light source is a laser.

9. The instrument as defined in claim 1 in which said light deflecting means includes a pentagon prism.

10. The instrument as defined in claim 1 in which the path is defined by measuring support means including graduations marked therealong.

11. A measuring instrument for optically measuring the coordinate distance between two or more measuring points comprising:
    a light source for providing a light beam;
    first means for deflecting said light beam;
    means for mounting said light source;
    means for mounting said first light deflecting means, in a first straight line which extends through said light source movable along a first path parallel to said first straight line;
    registering means mounted for movement along said path;
    means for defining a second path which extends along a second straight line perpendicular to and intersecting said first straight line;
    a second light deflecting means; and
    means for mounting said second light deflecting means for movement along said second path said second light deflecting means being intended for measuring the distance between a pair measuring points in a direction at right angles to the direction of measuring made with the first light deflecting means ;said first path extending to the intersection of said first and second straight lines so that said first light deflecting means can be moved thereto to deflect said light beam to said second light deflecting means.

12. The instrument as defined in claim 11 also including a third light deflecting means mounted for movement along said first path, between said light source and said first light deflecting means; said third light deflecting means including means mounted therein for partially deflecting said light beam and partially transmitting said light beam.

13. The instrument as defined by claim 11 in which at least one of said light deflecting means includes an angle indicating means which presents a measure of the angle of light deflection.

14. The instrument as defined in claim 13 in which said angle indicating means comprises two horizontal level indicators located in the horizontal plane at right angles to each other.

15. The instrument as defined in claim 13 in which the angle indicating means comprises a display device against which a small portion of said light beam projected onto to said deflecting means is reflected as a check light beam.

16. The instrument as defined in claim 13 in which said angle indicating means comprises a combination of horizontal level and angle of deflection indicators.

17. The instrument as defined in claim 11 in which said light source is a laser.

18. The instrument as defined in claim 11 in which said first light deflecting means includes a pentagon prism.

19. The instrument as defined in claim 11 in which at least one of said first and second paths is defined by means including graduations marked therealong.

* * * * *